United States Patent
Detcheverry et al.

(10) Patent No.: US 9,680,638 B2
(45) Date of Patent: Jun. 13, 2017

(54) NON ALTERABLE STRUCTURE INCLUDING CRYPTOGRAPHIC MATERIAL

(71) Applicant: GEMALTO SA, Meudon (FR)

(72) Inventors: Frank Detcheverry, La Ciotat (FR); Patrick Lambert, Marseilles (FR); Fabien Poplin, Aubagne (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/651,770

(22) PCT Filed: Dec. 3, 2013

(86) PCT No.: PCT/EP2013/075335
§ 371 (c)(1),
(2) Date: Jun. 12, 2015

(87) PCT Pub. No.: WO2014/090629
PCT Pub. Date: Jun. 19, 2014

(65) Prior Publication Data
US 2015/0312033 A1    Oct. 29, 2015

(30) Foreign Application Priority Data
Dec. 14, 2012    (EP) .................................... 12306593

(51) Int. Cl.
*H04L 9/00* (2006.01)
*H04L 9/08* (2006.01)
*H04L 9/32* (2006.01)

(52) U.S. Cl.
CPC .............. *H04L 9/08* (2013.01); *H04L 9/3247* (2013.01); *H04L 2209/72* (2013.01)

(58) Field of Classification Search
CPC ..... H04L 9/08; H04L 9/3247; H04L 2209/72; H04L 9/08221; H04L 2463/062
See application file for complete search history.

(56) References Cited

U.S. PATENT DOCUMENTS

| | | | | |
|---|---|---|---|---|
| 8,997,198 B1 * | 3/2015 | Kelley | .................... | H04L 63/06 726/10 |
| 2004/0123109 A1 * | 6/2004 | Choi | ..................... | H04L 9/3239 713/176 |
| 2007/0113084 A1 * | 5/2007 | Soda | ..................... | H04L 9/0891 713/168 |

OTHER PUBLICATIONS

International Search Report (PCT/ISA/210) mailed on Jan. 22, 2014, by the European Patent Office as the International Searching Authority for International Application No. PCT/EP2013/075335.

(Continued)

*Primary Examiner* — Brandon Hoffman
*Assistant Examiner* — Helai Salehi
(74) *Attorney, Agent, or Firm* — Buchanan Ingersoll & Rooney PC

(57) ABSTRACT

The present invention relates to a method to build a non-alterable structure and to such a non-alterable structure including data relative to a set of cryptographic material generated randomly or derived from a secret key linked to a business use, the non-alterable structure being intended to be transferred from a first entity to a second entity, the entities sharing at least an encryption/decryption key and a signature key, the structure comprising at least business data relative to the intended use of cryptographic material, an encrypted protection key encrypted with the encryption key, an encrypted set of cryptographic material encrypted with the protection key, a signature of the set of cryptographic material, the protection key and the data relative to the intended use of cryptographic material signed with the signature key.

4 Claims, 3 Drawing Sheets

(56) References Cited

OTHER PUBLICATIONS

Written Opinion (PCT/ISA/237) mailed on Jan. 22, 2014, by the European Patent Office as the International Searching Authority for International Application No. PCT/EP2013/075335.
Laila El Aimani, Generic Constructions for Verifiable Signcryption, Technicolor, Nov. 2, 2011, pp. 1-28.

* cited by examiner

NON ALTERABLE STRUCTURE INCLUDING CRYPTOGRAPHIC MATERIAL

FIELD OF THE INVENTION

The present invention pertains to security and key management. More particularly, it relates to a non alterable structure including data relative to a set of cryptographic material generated randomly or derived from a secret key linked to at least an identifier and to a method to build such a non alterable structure.

BACKGROUND OF THE INVENTION

In heterogeneous Key Management System (KMS) environment, there is generally no trust between the different entities. Therefore mother keys can't be exchanged and it is required to exchange random keys or derived keys instead of mother keys. Thus business needs to exchange a set of derived keys. Those keys are linked to business data (metadata) including at least data relative to an identifier. These metadata are useful to retrieve the identification, usage and origin of the set of keys.

In general, there are huge amounts of random or derived keys to exchange and there is a big issue to ensure integrity on this set of keys with metadata—not only the key cryptogram—to avoid replacing one key inside a set (For example: ENC/DEK/MAC used in SCP03).

Further alternative to the prior art and more advantageous solutions are, accordingly, be desirable to transport cryptographic material generated randomly or derived from a secret key.

SUMMARY OF THE INVENTION

The present invention aims to ensure integrity and confidentiality of a set of keys, certificates and associated business metadata.

For this purpose, the invention proposes a non-alterable structure including data relative to a set of cryptographic material generated randomly or derived from a secret key linked to a business use, said non-alterable structure being intended to be transferred from a first entity to a second entity, said entities sharing at least an encryption/decryption key and a signature key, said structure comprising at least:

business data relative to the intended use of cryptographic material, an encrypted protection key encrypted with the encryption key, an encrypted set of cryptographic material encrypted with the protection key, a signature of the set of cryptographic material, the protection key and the data relative to the intended use of cryptographic material, signed with the signature key.

Such a structure allows keeping the same keys and metadata all along keyset life cycle, including transport and storage. It combines encryption and integrity on a set of keys/metadata. With the invention, the set of cryptographic material is protected under the protection key, itself protected under an external key shared by entities. The invention enables to associate any data of the business in a non-alterable way with the set of cryptographic material.

Business data can be any kind of data related to the business use as eUiccId, Card Serial Number, IMSI, Profile ID, Secure Domain AID, GP KeySet version (from GP standard), eUicc Manufacturer ID, Distribution list, restricted usage domain, Key set origin, specific dates relative to the business etc.

The data integrity is ensured on whole structure by computing a signature with clear values of the cryptographic material. By using the signature and encrypted cryptographic material values, the invention ensures a high level of security and integrity on the set of cryptographic material, i.e. a keyset. Indeed, there is no mean to replace or update a key value or any metadata used in the signature. Thus the structure of the invention is unalterable. With the invention, all keys inside the keyset are protected under the encryption key. In fact, it is necessary to know this key to decrypt the protection key that will enable to decrypt the cryptographic material. To verify the signature there is a need to access the clear value of cryptographic material and thus, all the structure is protected. As the signature is computed using clear cryptographic material and protection key values, it ensures the whole structure integrity. The use of clear value to calculate the signature has other advantages that will be developed in the other part of the specification.

In a preferred embodiment, the protection key is a random symmetric key.

Such an embodiment enables to change the protection key at each transportation without requiring further cryptographic means. Furthermore as, with the invention, the cryptographic material is not encrypted with the shared encryption key, if it is desired to change the encryption key, there is no need to decrypt and re-encrypt the cryptographic material but only the protection key. As signature is done on clear value of the protection key and cryptographic material, there is no further need to decrypt/encrypt or sign anything else in case of change of the global encryption key, for example for storage. The overall security is nevertheless ensured.

According to an advantageous feature, the non-alterable structure further includes a specific date of the kind of an expiry date, an activation date etc, the signature being calculated with said specific date.

This feature can enable in particular to limit in time the use of the enclosed cryptographic material, always in a non-alterable way.

The present invention also concerns a method to build a non-alterable structure including data relative to a set of cryptographic material generated randomly or derived from a secret key linked to a business use, said non-alterable structure being intended to be transferred from a first entity to a second entity, said entities sharing at least an encryption/decryption key and a signature key, said method comprising:

selecting business data relative to the intended use of cryptographic material, generating a protection key, sign the set of cryptographic material, the protection key and the business data relative to the intended use of cryptographic material with the signature key to obtain a signature, encrypt the set of cryptographic material with the protection key, encrypt the protection key with the encryption key, the non-alterable structure comprising the signature, the business data relative to the intended use of cryptographic material, the encrypted set of cryptographic material and the encrypted protection key.

To the accomplishment of the foregoing and related ends, one or more embodiments comprise the features hereinafter fully described and particularly pointed out in the claims.

BRIEF DESCRIPTION OF THE DRAWINGS

Other advantages and novel features will become apparent from the following detailed description when considered in conjunction with the drawings and the disclosed embodiments are intended to include all such aspects and their equivalents. The following description and the annexed drawings set forth in detail certain illustrative aspects and are indicative of but a few of the various ways in which the principles of the embodiments may be employed. In the drawings.

DETAILED DESCRIPTION OF EMBODIMENTS OF THE INVENTION

Figure 1:
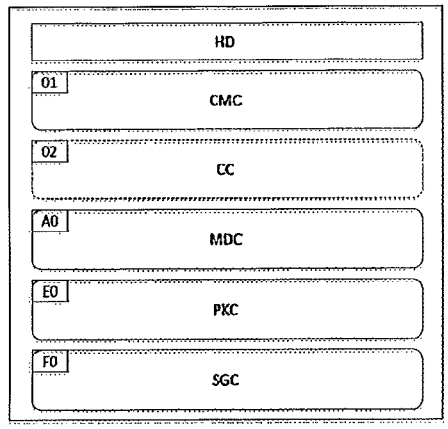
FIG. 1 represents a non-alterable structure of the invention.

For clarity, only those elements and steps which are useful to the understanding of the present invention have been shown in the drawings and will be described.

FIG. 1 schematically shows a non-alterable structure S of the invention. This structure is intended to be transported between two entities sharing a secret encryption key $K_E$ and a secret signature key $K_{SG}$.

The structure S includes a header HD, a cryptographic material container CMC including cryptographic material CM, optionally a certificate container CC, a metadata container MDC, said metadata including at least data relative to an identifier, a protection key container PKC and a signature container SGC.

An implementation according to a TLV format is shown in the following. This format is preferably chosen for performance in term of calculation resources and economy in terms of memory. This is advantageous to counter memory constraints on embedded systems even if less flexible. In the illustrative embodiment disclosed herein, cryptographic material is a keyset generated randomly or derived from a secret mother key.

Figure 2:
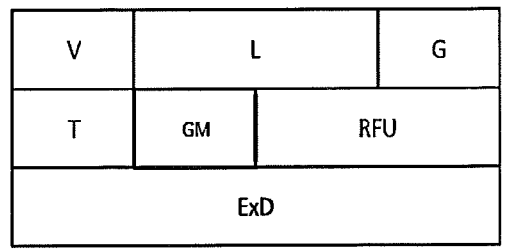
FIG. 2 shows an advantageous embodiment of a header of the non-alterable structure of the invention.

FIG. 2 more particularly shows an advantageous embodiment of the header HD. It stores main information of keyset: version of the keyset V, length of the whole keyset L, group G (for example: GP, Multos etc), type T (for example SCP03/SCP02/CA), a generation mode GM of the keyset (RANDOM, CRYPTO or TOKEN). The header HD can comprise room reserved for future use RFU.

Here, advantageously, the header HD stores an expiration date ExD. The expiration date can use the following format (GMT): 2 octets for year, 1 octet for month, 1 octet for day. For example, 11 Oct. 2011=>07DB0A0B.

Figure 3:
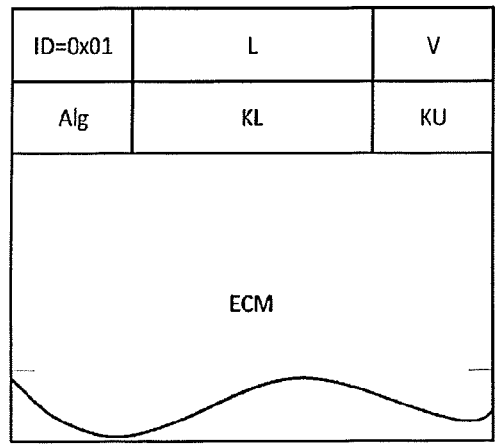
FIG. 3 shows a preferred embodiment for a set of cryptographic material.

FIG. 3 shows schematically an embodiment of a cryptographic material container CMC of the invention. This container CMC is used to store key information: algorithm of key Alg (DES, AES, PSK etc for symmetric cases, RSA, ECC, DH etc in asymmetric cases), usage KU (type of key according to the keyset type), length of key KL (16/24/32 etc) and the encrypted value EK, said encryption using a protection key PK that is preferably a random key.

If the contained cryptographic material CM concerns a symmetric use case, as shown on FIG. 3, EK is advantageously a sum [Random+clear value] encrypted using the protection key PK. For example, the random is coded on 16 octets and clear value is coded n octets. Random avoids having the same encrypted value for a clear value and enables to be attack resistant.

Furthermore, the container CMC comprises a section identifier of key container ID, a section length of key container L, a section version of key container V, in symmetric or asymmetric use case.

Key usage can be, in case of GP SCP03, compliant with standard (spec_2.2.1 §11.1.9). For example, the structure of the invention comprises an SCP01/02/03/80 KeySet (C-MAC='14', C-ENC='18', C-DEK='48') or an SCP81 KeySet (PSK='3C', C-DEK='48').

Optionally, the structure of the invention comprises a certificate container CC constructed as known by the man skilled in the art.

Figure 4:
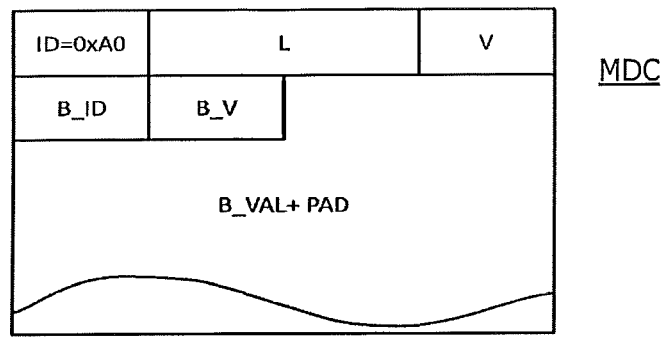
FIG. 4 shows a preferred embodiment for the metadata used in a structure according to the invention.

FIG. 4 shows schematically an embodiment of a metadata container MDC of the invention used to store data linked to a business use comprising at least data relative to the intended use of cryptographic material.

For example, the business data in a TLV format (3+n) comprising a business tag on 1 octet, a business length on 2 octets and a business value on n octets. Padding octets can be added.

The metadata container MDC comprises at least a business identifier B_ID. This essential data, included in data signed to ensure the integrity of the structure of the invention, is preferably completed with the version B_V to represent business data and with a business value B_VAL, such data being included in data used for the calculation of the signature. Some metadata could further be encrypted in the whole metadata that are used to calculate the signature. The check of the signature would anyway be made on the metadata as included in the metadata container.

The TLV format is advantageously used to store business value B_VAL that can be completed with padding PAD if necessary for data alignment.

For example in the Global Platform standard SCP03, the GP business identifier B_ID will be 0x01. The business value B_VAL will include a tag Application Identifier, a tag Secure Element Id (eUiccId or IMSI or profile Id) and a tag KeySet Version Number.

The metadata container MDC advantageously further includes a metadata identifier ID, the length of metadata component L, the version V of metadata used. In preferred embodiment the whole metadata container is used in the calculation of the signature but only part of it could be used in some embodiments.

Figure 5:
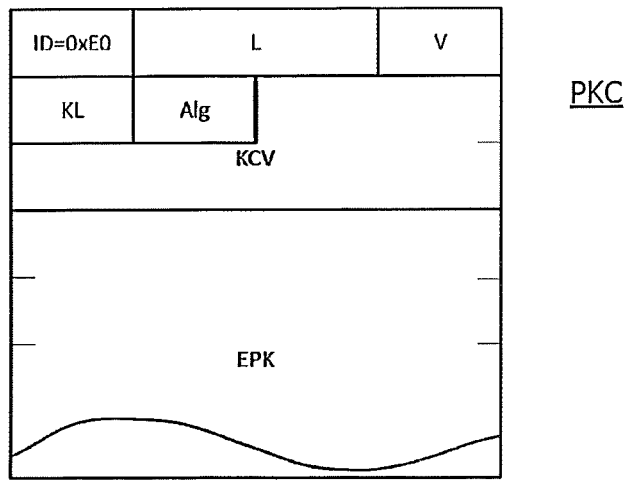
FIG. 5 shows a preferred embodiment for the encrypted protection key.

FIG. 5 shows schematically a protection key container PKC of the invention. It is dedicated to contain the protection key PK used to encrypt cryptographic material (keys) inside the cryptographic material container CMC.

This container PKC comprises a component identifier ID identifying the protection key, a component length L indicating the length of the protection component or container PKC, a component version V. It further comprises the key length KL in bytes (typically AES-128 or AES-256) and the used algorithm Alg (AES-CBC for example).

It can also comprise a key check value KCV, the clear value of which being then signed. The key check value KCV can be the one of the encryption key $K_E$ used to encrypt the protection key and shared between entities that will exchange the non-alterable structure S of the invention. Nevertheless, with this feature, if the second entity needs to change the encryption key and if the KCV is included in data used for integrity check, this will require the signature to be calculated again.

Thus, in a preferable embodiment, the key check value KCV is the one of the protection key PK. In this case, there is no need to recalculate the signature even if the encryption key is modified.

At last the protection key container PKC includes the encrypted value of the protection key EPK.

Figure 6:
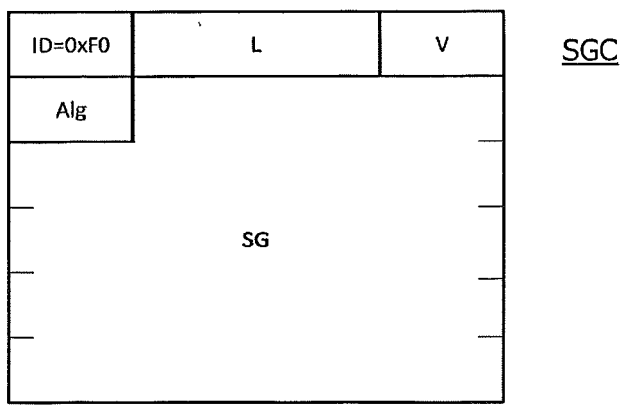
FIG. 6 shows a preferred embodiment for a signature as included in a structure of the invention.

FIG. 6 shows schematically a signature container SGC of the invention. It ensures integrity of the non-alterable structure S. Signature SG is calculated by hashing (typically HMAC) using a signature key $K_{SG}$ on clear key values and other clear data thus including protection key PK in clear.

It includes a component identifier ID, a component length L, a version of integrity used V, a supported algorithm Alg and the calculated signature SG.

The signature is calculated using the secret signature key $K_{SG}$ and for example algorithm HMAC-SHA1 leading to a 20 octets length or HMAC-SHA256 leading to a 32 octets length. Signature SG can be truncated.

Figure 7:
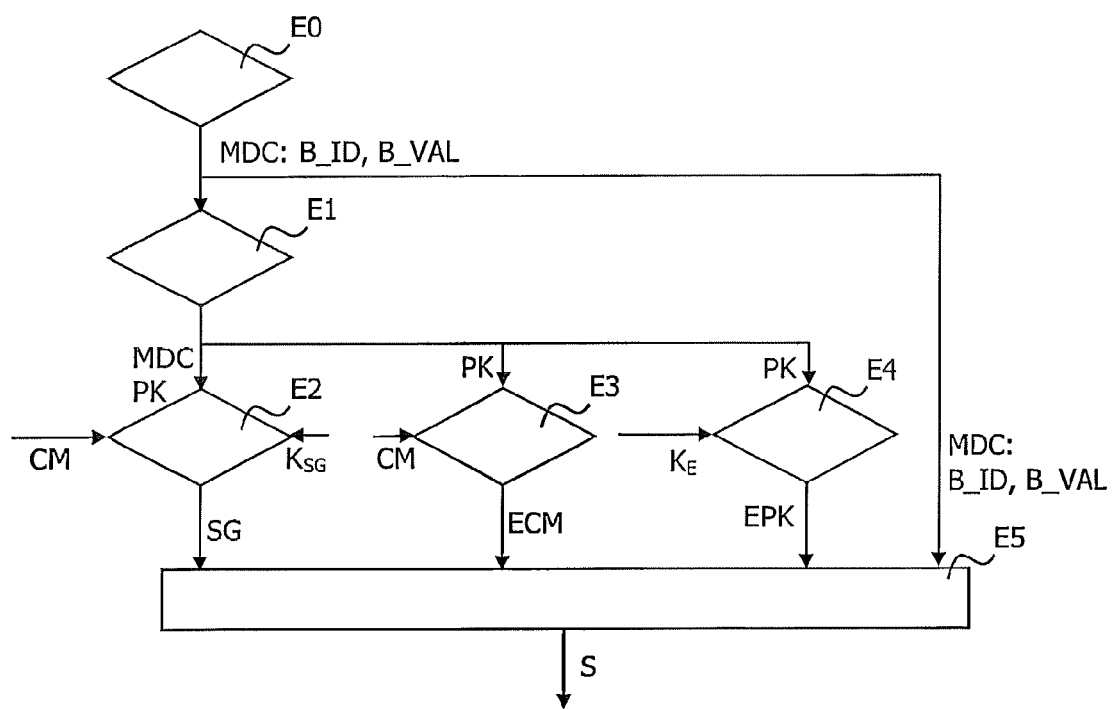
FIG. 7 shows a flowchart of the method of the invention.

FIG. 7 shows a flowchart of the method of the invention dedicated to build a non-alterable structure S including data relative to a set of cryptographic material CM generated randomly or derived from a secret key linked to a business use.

In a first step E1, data relative to the intended use of cryptographic material CM are selected. Such data as seen before are at least an identifier B_ID of the concerned intended business.

Then a protection key PK is generated in a step E2. Alternatively, the protection key PK can be retrieved if generated previously. Preferably the protection key PK is a random one-time used key.

The protection key PK is transferred with data, at least one metadata, relative to the intended use of cryptographic material CM to a step E3. This step E3 also receives the cryptographic material in clear CM. This step consists in the calculation of a signature from the clear protection key PK, the clear cryptographic material CM and the clear business data relative to the intended use as included in the metadata container MDC. This calculation uses the signature key $K_{SG}$ shared between entities authorized to receive data in the non-alterable structure.

The protection key PK is also used in a step E4 that also receives the cryptographic material CM. In this step, the cryptographic material CM is encrypted using the protection key PK. An encrypted cryptographic material ECM is obtained.

Then, in a step E5, the protection key PK is encrypted using the encryption key $K_E$ shared between entities that are authorized to access the content of the non-alterable structure S.

A non-alterable structure S of the invention is then constructed in a step E6 by introducing the signature SG from step E3, the encrypted cryptographic material ECM from step E4, the encrypted protection key EPK from step E5 and the clear data B_ID relative to the intended use of the cryptographic material CM from step E2. This construction comprises the constitution of each component detailed on figures and gathering of these components in a structure as shown on FIG. 1.

With the invention there is no possibility to access and check data stored in the non-alterable structure without having the both secret key signature key $K_{SG}$ and encryption key $K_E$. The structure thus presents strong protection features.

To access the data and check them, it is necessary to decrypt the protection key with the encryption key $K_E$, to decrypt the cryptographic material CM using the protection key, calculate a signature, with the signature key $K_{SG}$, from the decrypted protection key PK, from the decrypted cryptographic material CM and from data in clear relative to the intended use of the cryptographic material and to compare this signature with the one included in the structure.

The invention enables to gather keys, certificates and associated metadata in a single and complete structure comprising:

1 to n keys (protected under encryption key);
Optionally 0 to n certificates;
1 to n business metadata;
1 encryption key protected under a dedicated external secret key;
1 signature with a second dedicated external secret key.

It brings the following advantages:

Integrity and security on a set of elements during transport between entities;
Strong link between keys and their data;
Modularity during creation;
Unalterable during usage;
Generic, can manage symmetric or asymmetric keys;
Performance on embedded systems;
Traceability using metadata as identifier;
Possibility to exchange between several entities.

The invention can be integrated in standard's messaging like Global Platform Messaging API or part of public key infrastructure or other new standard concerning telecom and other field.

The invention ensures that entities that do not have the both secret keys do not have access to the content of the non-alterable structure of the invention and cannot check the integrity of the cryptographic material. They also do not have knowledge on the format of the structure. It ensures that only authorized Key Management Systems are able to build and extract data from the encrypted parts—the cryptographic material and the protection key—of the structure of the invention, other fields being in clear—metadata container in particular.

Typically the first entity is a personalization server. In this case second entities often decrypt data and re-encrypt them under their own encryption key. In this case the transportation encryption key $K_E$, common for several second entities, is different from storage keys. The invention enables to store directly the signature with newly encrypted data. As the signature is calculated on clear value, there is no need to calculate a new signature.

In term of traceability, the invention helps in answering the certification requirements in term of logs. The invention permits to guarantee that a key extracted from the non-alterable structure of the invention and used in a secure environment is the right one. Rightness of the traceability of the use of the key is thus guaranteed.

It solves one of the known weaknesses in the key's transportation. Today keys and data relative to the business are transported separately. There is no way to ensure that no mixing was done in the use of keys.

The invention requires the key to be transported several times if applicable in several businesses if the corresponding metadata are not included in first intention. Nevertheless, the security and integrity of keys and of their use are guaranteed as the specific use is intrinsically linked with the set of cryptographic material itself.

In the above detailed description, reference is made to the accompanying drawings that show, by way of illustration, specific embodiments in which the invention may be practiced. These embodiments are described in sufficient detail to enable those skilled in the art to practice the invention.

The description is not to be taken in a limiting sense and the scope of the present invention is defined only by the appended claims, appropriately interpreted, along with the full range of equivalents to which the claims are entitled.

The invention claimed is:

1. A first computing entity, for building a non-alterable structure, configured to:
   select business data relative to an intended use of a set of cryptographic material, said business data having a functional link with the set of cryptographic material, said cryptographic material being generated randomly or derived from a secret key, said secret key being linked to a business use;
   encrypt a protection key with an encryption/decryption key,
   encrypt the set of cryptographic material with the protection key,
   sign the set of cryptographic material, the protection key and the business data relative to the intended use of cryptographic material with a signature key, and
   transmit the non-alterable structure to a second computing entity that shares at least the encryption/decryption key and a signature key with the first computing entity, for performing cryptographic operations, said transmitted non-alterable structure including (i) the selected business data, said selected business data being in non-encrypted form, (ii) the encrypted protection key, (iii) the encrypted set of cryptographic material, and (iv) the signature of the set of cryptographic material, the protection key and the business data relative to the intended use of cryptographic material signed with the signature key.

2. The first computing entity according to claim 1, wherein the protection key is a random symmetric key.

3. The first computing entity according to claim 1, further configured to include, within the non-alterable structure, a specific date comprising at least one of an expiry date and an activation date, wherein the signature is calculated with said specific date.

4. A method to build a non-alterable structure including data relative to a set of cryptographic material generated randomly or derived from a secret key linked to a business use, said non-alterable structure being intended to be transmitted from a first computing entity to a second computing entity, said first and second computing entities sharing at least an encryption/decryption key and a signature key, said method comprising:
   selecting, by the first computing entity, business data relative to the intended use of the set of cryptographic material;
   generating, by the first computing entity, a protection key;
   signing, by the first computing entity, the set of cryptographic material, the protection key and the business data relative to the intended use of cryptographic material with the signature key to obtain a signature;
   encrypting, by the first computing entity, the set of cryptographic material with the protection key;
   encrypting, by the first computing entity, the protection key with the encryption key; and
   transmitting, by the first computing entity, the non-alterable structure, to the second computing entity for performing cryptographic operations, said transmitted non-alterable structure comprising (i) the signature of the set of cryptographic material, the protection key and the business data relative to the intended use of cryptographic material signed with the signature key, (ii) non-encrypted business data relative to the intended use of cryptographic material, (iii) the encrypted set of cryptographic material, and (iv) the encrypted protection key.

* * * * *